United States Patent
Kwak et al.

(10) Patent No.: US 7,312,111 B2
(45) Date of Patent: Dec. 25, 2007

(54) LIQUID CRYSTAL DISPLAY PANEL

(75) Inventors: Dong Yeung Kwak, Daegukwangyeok-shi (KR); Byoung Ho Lim, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 31 days.

(21) Appl. No.: 10/026,479

(22) Filed: Dec. 27, 2001

(65) Prior Publication Data
US 2002/0113915 A1 Aug. 22, 2002

(30) Foreign Application Priority Data
Dec. 27, 2000 (KR) ................. 2000-83102

(51) Int. Cl.
*H01L 29/04* (2006.01)
(52) U.S. Cl. ............ 438/151; 257/59; 257/72; 257/E27.131; 349/43
(58) Field of Classification Search ......... 349/42, 349/43, 46, 139, 39, 141; 345/92, 87, 100; 257/59
See application file for complete search history.

(56) References Cited

U.S. PATENT DOCUMENTS

| 5,097,297 | A | * | 3/1992 | Nakazawa | 357/4 |
|---|---|---|---|---|---|
| 5,166,085 | A | * | 11/1992 | Wakai et al. | 437/40 |
| 5,473,168 | A | * | 12/1995 | Kawai et al. | 257/61 |
| 5,612,565 | A | * | 3/1997 | Kusumoto | 257/401 |
| 5,886,757 | A | * | 3/1999 | Song et al. | 349/43 |
| 6,218,206 | B1 | * | 4/2001 | Inoue et al. | 438/30 |
| 6,274,884 | B1 | * | 8/2001 | Lee et al. | 257/57 |
| 6,310,668 | B1 | * | 10/2001 | Ukita | 349/42 |
| 6,335,276 | B1 | * | 1/2002 | Park et al. | 438/648 |
| 6,524,876 | B1 | * | 2/2003 | Baek et al. | 438/48 |
| 6,531,392 | B2 | * | 3/2003 | Song et al. | 438/648 |
| 6,707,441 | B1 | * | 3/2004 | Hebiguchi et al. | 345/92 |
| 6,853,406 | B2 | * | 2/2005 | Lee et al. | 349/43 |

FOREIGN PATENT DOCUMENTS

JP 2000-22156 * 1/2000

* cited by examiner

*Primary Examiner*—Sue A. Purvis
*Assistant Examiner*—Fazli Erdem
(74) *Attorney, Agent, or Firm*—McKenna Long & Aldridge LLP

(57) ABSTRACT

An LCD panel includes a plurality of gate lines and gate electrodes formed on a substrate and a gate insulating film formed on the substrate including the gate lines and the gate electrodes. A semiconductor film is formed in a region on the gate insulating film and an ohmic contact film formed on the semiconductor film. A plurality of data lines cross the gate lines; a source electrode is formed on the ohmic contact film; and a pixel electrode is formed in a pixel region defined by the gate and data lines. A drain electrode is formed on the ohmic contact film, and has an uneven width. Since a portion of drain electrode that overlaps with the gate electrode has a smaller width than a width of other portions of the drain electrode, variation in an area of the drain electrode overlapped with the gate electrode is small, so that variation of the parasitic capacitance can be reduced, thereby improving picture quality.

9 Claims, 2 Drawing Sheets

LIQUID CRYSTAL DISPLAY PANEL

This application claims the benefit of Korean Patent Application No. 2000-83102, filed on Dec. 27, 2000, the entirety of which is hereby incorporated by reference for all purposes as if fully set forth herein.

BACKGROUND OF THE INVENTION

1. Field of the Invention

The present invention relates to a liquid crystal display (LCD) panel, and more particularly, to an LCD panel that can obtain a picture image of high picture quality using a structure of a thin film transistor (TFT) having parasitic capacitance with small variation.

2. Discussion of the Related Art

FIG. 1 is an equivalent circuit illustrating a unit pixel of a general TFT-LCD array.

If a gate signal voltage is applied to the TFT-LCD array, the TFT is turned on so that a data voltage having picture image data is applied to a liquid crystal capacitor $C_{LC}$ through the TFT for a turn-on time of the TFT. At this time, current $I_{ON}$ for charging the liquid crystal capicitor is obtained as follows.

$$I_{ON} = \frac{C_{TOT} \cdot V}{\tau_g} \quad (1)$$

In the equation (1), $C_{TOT}$ is a sum of a capacitor by the liquid crystal capacitor $C_{LC}$ and a storage capacitor $C_{STO}$ for maintaining a phase of the liquid crystal until a signal is applied, V is the voltage and $\tau_g$ is turn-on time of a gate.

A total amount of charge in the capacitor by the liquid crystal capacitor and the storage capacitor is maintained until a next signal is received after the gate is turned off. Actually, since a leakage current $I_{OFF}$ exists due to resistance $R_{off}$ of a channel layer of the TFT, distortion of a liquid crystal applying voltage $V_{LC}$, i.e., a drop $\delta Vg$ (a difference between the maximum gate voltage applied when the gate is turned on and the minimum gate voltage applied when the gate is turned off) of the liquid crystal applying voltage occurs, thereby generating flickering. The leakage current $I_{OFF}$ can be expressed as follows.

$$I_{OFF} = \frac{C_{TOT} \cdot \delta Vg}{\tau_g \cdot N_g} \quad (2)$$

In the equation (2), $N_g$ is the number of total gates, and $\tau_g \cdot N_g$ is time of one frame.

Especially, in a hydrogenated amorphous silicon (a-Si:H) TFT, overlap portions exist between a gate electrode g and a source electrode s and between a gate electrode g and a drain electrode d, so that parasitic capacitances of $C_{gs}$ and $C_{gd}$ exist respectively.

The parasitic capacitance is defined as the inductance or capacitance that has a function in addition to an original function of components according to the size, length, and arrangement of a device when the components are integrated to constitute a circuit. In this case, the parasitic capacitance means capacitance.

At this time, the parasitic capacitance $C_{gd}$ generates voltage fluctuation $\Delta Vp$ (a difference between the voltage charged to the pixel electrode when the gate is turned on and the voltage charged to the pixel electrode and voltage charged to the pixel electrode when the gate is turned off) in the liquid crystal applying voltage $V_{LC}$ by capacitive coupling when the TFT is turned off. Such voltage fluctuation temporally varies light transmissivity of an LCD panel and significantly acts on picture quality. The voltage fluctuation by capacitive coupling between the gate and the source/drain is compensated by a voltage $V_{com}$ applied to the common electrode. However, since the liquid crystal capacitance is a function of a data voltage, it is difficult to compensate all the data voltages. For this reason, flickering occurs.

The related art LCD panel has several problems.

If the gate is turned off, no variation of the voltage of the liquid crystal occurs due to the action of the capacitance $C_{st}$. Liquid crystal applying voltage drop occurs due to the capacitance $C_{gd}$ in the overlap portion between the gate electrode g and the drain electrode d, thereby causing flickering when a picture image is displayed. Therefore, the amount of voltage drop depends on $C_{gd}$ generated by the overlap area between the gate electrode and the drain electrode.

Generally, controlling an applying signal in a driving circuit can compensate such a voltage drop. However, if misalignment of the mask occurs in the process of fabrication, a voltage drop of the liquid crystal cannot be compensated by this method.

SUMMARY OF THE INVENTION

Accordingly, the present invention is directed to an LCD panel that substantially obviates one or more of the problems due to limitations and disadvantages of the related art.

An advantage of the present invention is to provide an LCD panel in which variation of an overlap area between a gate electrode and a drain electrode connected with a pixel electrode is reduced to minimize variation of capacitance, thereby improving picture quality.

Another advantage of the present invention is to provide an LCD panel such that when variation of the overlap area between the gate electrode and the drain electrode occurs due to misalignment, variation of $C_{gd}$ can be minimized by making a portion of the drain electrode that does not overlap with the gate electrode with a small width.

Additional features and advantages of the invention will be set forth in the description that follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages in accordance with the present invention, as embodied and broadly described, an LCD panel according to the present invention includes a plurality of gate lines and gate electrodes formed on a substrate; a gate insulating film formed on the substrate including the gate lines and the gate electrodes; a semiconductor film formed in a region on the gate insulating film; an ohmic contact film formed on the semiconductor film; a plurality of data lines formed to cross the gate lines; a source electrode formed on the ohmic contact film; a pixel electrode formed in a pixel region defined by the gate and data lines; and a drain electrode formed on the ohmic contact film, and having an uneven width.

In an embodiment of the present invention, the drain electrode has first and second portions, wherein the first and second portions overlap with the gate electrode, the second portion has a smaller width than the first portion, so that variation of parasitic capacitance caused by overlap between the gate electrode and the drain electrode can be reduced. In other words, even if any variation occurs in overlay of the drain electrode which is formed together with the data lines and the source electrode using a mask, variation in an area of the drain electrode overlapped with the gate electrode is small, so that variation of the parasitic capacitance can be reduced.

In another embodiment of the present invention, the drain electrode has first, second and third portions, wherein the first and second portions overlap with the gate electrode, the second portion has a smaller width than the first and third portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 2A:
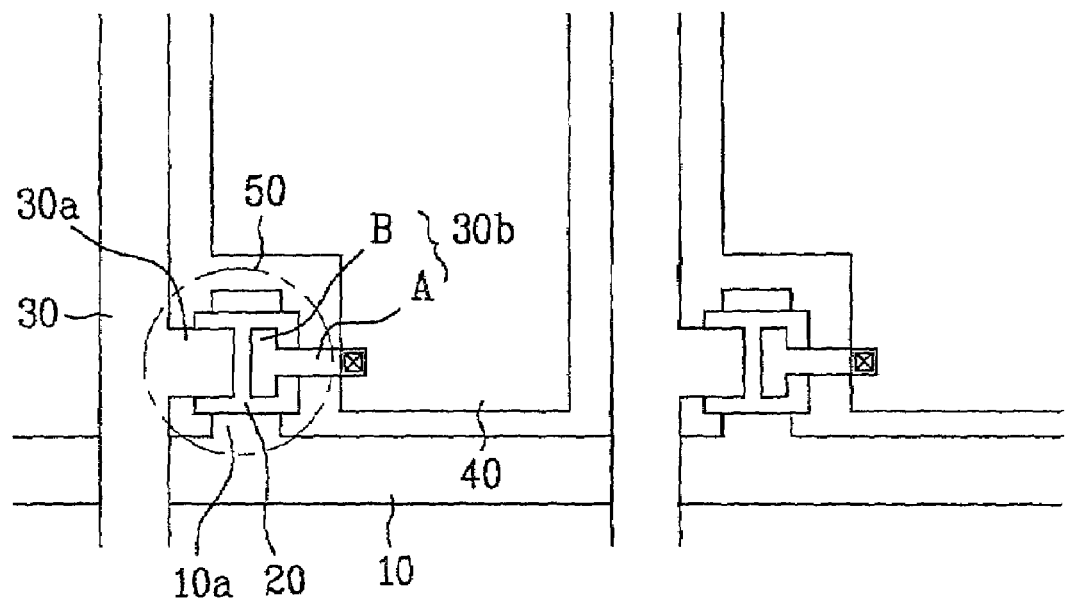
FIG. 2A is a plan view illustrating an LCD panel according to a first embodiment of the present invention.

FIG. 2A is a plan view illustrating an LCD panel according to the first embodiment of the present invention, in which variation in an area of a drain electrode of a TFT is reduced.

As shown in FIG. 2A, a gate line 10 and a data line 30 are arranged on a substrate in first and second directions to define a pixel region. Actually, an LCD panel includes an active region having a plurality of unit pixel regions. A thin film transistor (TFT) 50 is formed at a crossing point between the gate line 10 and the data line 30.

The TFT 50 includes a gate electrode 10a formed on the substrate simultaneously with the gate line 10, a gate insulating film (not shown) formed on an entire surface of the substrate including an upper portion of the gate electrode 10a, a semiconductor film 20 and an ohmic contact film (not shown) sequentially formed on the gate insulating film, and source and drain electrodes 30a and 30b formed on the ohmic contact film. The gate electrode 10a and the source electrode 30a are respectively connected with the gate line 10 and the data line 30.

A passivation film (not shown) is formed on the entire surface including the TFT 50. A region of the passivation film formed on the drain electrode 30b is exposed to form a contact hole (indicated by x). A pixel electrode 40 of a transparent conductive film is formed in the pixel region and is connected with the drain electrode 30b through the contact hole.

Furthermore, an alignment film may be formed on the entire surface of the substrate including the pixel electrode 40 by a conventional rubbing method or photo-alignment method.

An LCD device includes a first substrate provided with the TFT, a second substrate opposing the first substrate, on which a black matrix and a color filter are formed, and a liquid crystal layer formed between the first and second substrates.

A method for manufacturing the TFT will be described.

A metal material is formed on the substrate by a sputtering method and then patterned using a mask to form a plurality of gate lines 10 and gate electrodes 10a.

Subsequently, silicon nitride or silicon oxide is deposited on the entire surface of the substrate including the gate lines 10 and the gate electrodes 10a by a chemical vapor deposition (CVD) process, so that the gate insulating film is formed. The semiconductor film 20 used as a channel of the TFT 50 and the ohmic contact film are then formed.

A metal, such as Al, Mo, Cr, Ta, or Al alloy, is formed on the entire surface of the gate insulating film including the ohmic contact film and then patterned using a mask, so that the data line 30, the source electrode 30a, and the drain electrode 30b are formed to cross the gate line 10.

At this time, a portion A of the drain electrode that overlaps with the gate electrode 10a and connects with the pixel electrode 40 has a smaller width than a width of a portion B of the drain electrode overlapped with the gate electrode 10a.

In other words, when any variation occurs in the overlap portion between the gate electrode 10a and the source and drain electrodes 30a and 30b, variation of the capacitance $C_{gd}$ is minimized due to the thin line width of the drain electrode portion.

Figure 2B:
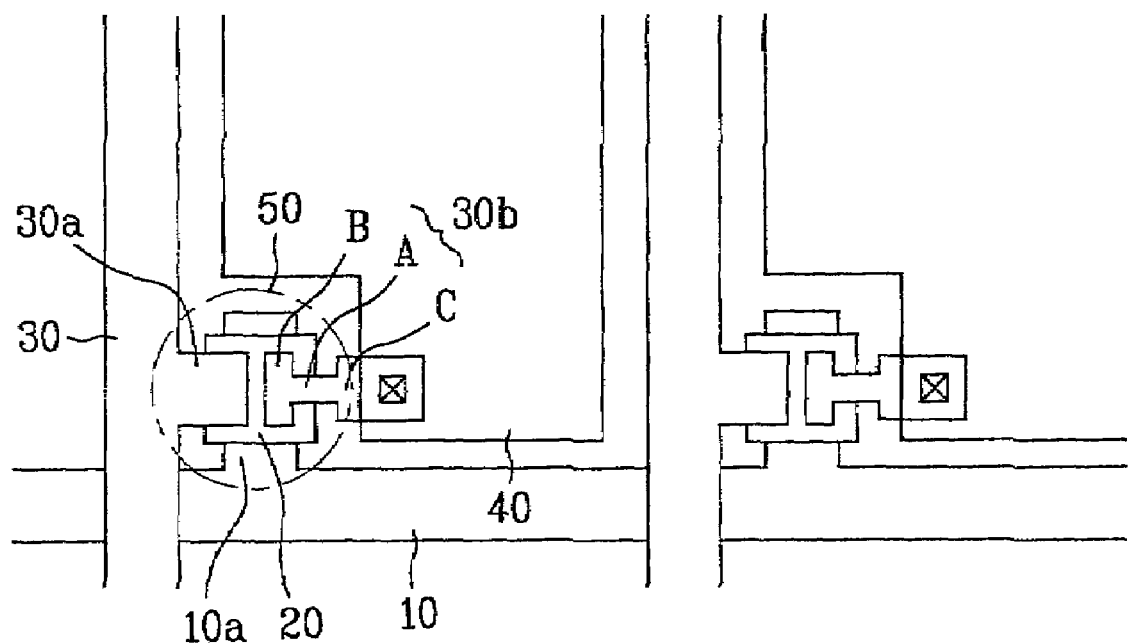
FIG. 2B is a plan view illustrating an LCD panel according to a second embodiment of the present invention.

FIG. 2B is a plan view illustrating an LCD panel according to the second embodiment of the present invention, in which variation of an area of a drain electrode of a TFT is reduced.

A structure of a TFT and a process for manufacturing the TFT are identical to the aforementioned first embodiment of the present invention.

The portion A of the drain electrode overlaps with the gate electrode 10a and has a smaller width than a width of both a portion C connected to the pixel electrode 40, and a portion B of the drain electrode overlapped with the gate electrode 10a.

In the first and second embodiments of the present invention, a portion of the drain electrode that does not overlap with the gate electrode 10a has a small width. Thus, even if misalignment occurs when the data line 30, the source electrode 30a and the drain electrode 30b are formed based on the gate line 10, variation of the overlap area between the gate electrode 10a and the drain electrode 30b can be reduced.

Figure 1:
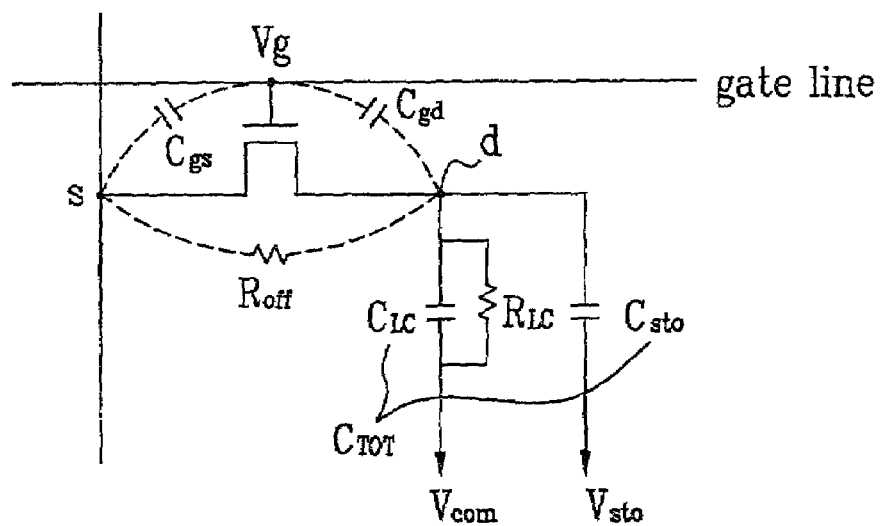
FIG. 1 is an equivalent circuit illustrating a unit pixel of a general TFT-LCD.

Referring to FIG. 1, if the area variation of the overlap portion is reduced, variation of the parasitic capacitance $C_{gd}$ between the gate electrode 10a and the drain electrode 30b is reduced. Accordingly, fluctuation $\Delta V_p$ of the liquid crystal voltage by the capacitive coupling is reduced when the TFT 50 is turned off. This will be apparent from the following equation.

$$\Delta V p = \frac{C_{gd}}{C_{LC} + C_{STO} + C_{gd}} \delta V_g \quad (3)$$

CSTO: storage capacitor
CLC: capacitor by liquid crystal
δVg: gate voltage drop

The aforementioned LCD panel according to the present invention has the following advantages.

Since a portion of the drain electrode overlaps with the gate electrode has a smaller width than a width of other portions of the drain electrode, variation of the area of the drain electrode overlapped with the gate electrode is small. In this case, since variation of capacitance due to the overlap between the gate electrode and the drain electrode is reduced, picture quality of the LCD panel can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of making a liquid crystal display panel comprising the steps of:
    forming a plurality of gate lines and gate electrodes on a substrate;
    forming a gate insulating film on the substrate including the gate lines and the gate electrodes;
    forming a semiconductor film in a region on the gate insulating film;
    forming an ohmic contact film on the semiconductor film;
    forming a plurality of data lines in a crossing pattern with the gate lines;
    forming a source electrode on the ohmic contact film;
    forming a pixel electrode in a pixel region defined by the gate and data lines; and
    forming a drain electrode on the ohmic contact film;
    wherein the drain electrode is formed to have a variation in width in a portion that overlaps one of the plurality of gate electrodes.

2. The method of claim 1, wherein a first portion of the drain electrode has a smaller width than a second portion of the drain electrode.

3. The method of claim 1, wherein a second portion of the drain electrode has a smaller width than a first portion and a third portion.

4. The method of claim 1, wherein a first and second portion of the drain electrode overlap with the gate electrode, and the second portion is connected with the pixel electrode, the second portion having a smaller width than the first portion.

5. The method of claim 1, wherein a first and second portion of the drain electrode overlap with the gate electrode, and a third portion is connected with the pixel electrode, the second portion having a smaller width than the first and third portions.

6. The method of claim 1, wherein the gate lines and gate electrodes are formed by a sputtering method and then patterned using a mask.

7. The method of claim 1, wherein the gate insulating film is formed by a chemical vapor deposition (CVD) process.

8. The method of claim 7, wherein the gate insulating film includes one of silicon nitride and silicon oxide.

9. The method of claim 1, wherein the data line, the source electrode and the drain electrode include one of Al, Mo, Cr, Ta, and Al alloy.

* * * * *